(12) United States Patent
Iwanaga

(10) Patent No.: US 7,304,830 B2
(45) Date of Patent: Dec. 4, 2007

(54) LAMINATED CERAMIC CAPACITOR

(75) Inventor: Daisuke Iwanaga, Tokyo (JP)

(73) Assignee: TDK Corporation, Tokyo (JP)

( * ) Notice: Subject to any disclaimer, the term of this patent is extended or adjusted under 35 U.S.C. 154(b) by 203 days.

(21) Appl. No.: 11/191,978

(22) Filed: Jul. 29, 2005

(65) Prior Publication Data

US 2006/0023398 A1   Feb. 2, 2006

(30) Foreign Application Priority Data

Jul. 29, 2004   (JP)   ............................. P2004-222426

(51) Int. Cl.
*H01G 4/228* (2006.01)
(52) U.S. Cl. ................. 361/306.1; 361/311; 361/313; 361/321.1; 361/321.2; 361/321.4; 361/306.3
(58) Field of Classification Search ............. 361/321.1, 361/321.2, 321.5, 311–313, 306.1, 306.3, 361/321.4, 302–305
See application file for complete search history.

(56) References Cited

U.S. PATENT DOCUMENTS

| 5,619,393 | A | * | 4/1997 | Summerfelt et al. | ..... 361/321.1 |
| 6,522,521 | B2 | * | 2/2003 | Mizuno et al. | .......... 361/321.4 |
| 6,544,857 | B1 | * | 4/2003 | Hironaka et al. | ........... 438/396 |
| 6,605,515 | B2 | * | 8/2003 | Kitagawa et al. | ........... 438/393 |
| 6,690,571 | B2 | * | 2/2004 | Shindo et al. | .............. 361/311 |
| 6,699,809 | B2 | * | 3/2004 | Fujikawa et al. | ........... 501/138 |

FOREIGN PATENT DOCUMENTS

JP   B 3370933   11/2002

* cited by examiner

*Primary Examiner*—Nguyen T. Ha
(74) *Attorney, Agent, or Firm*—Oliff & Berridge, PLC

(57) ABSTRACT

A laminated ceramic capacitor including a capacitor body where internal electrodes and a dielectric layer are alternately laminated, and external electrodes are provided on the end faces thereof. In this capacitor body, high resistance layers are provided between the internal electrodes and dielectric layer. These high resistance layers contain a ceramic material, an element including at least one selected from Mn, Cr, Co, Fe, Cu, Ni, Mo and V, and/or a rare earth element.

11 Claims, 3 Drawing Sheets

LAMINATED CERAMIC CAPACITOR

BACKGROUND OF THE INVENTION

1. Field of the Invention

The present invention relates to a laminated ceramic capacitor.

2. Related Background of the Invention

In the prior art, a laminated ceramic capacitor has a structure where a dielectric layer of a ceramic material and an internal electrode are laminated alternately. In recent years, a demand has emerged for a small laminated ceramic capacitor having a large electrostatic capacitance. In order to satisfy this demand, in laminated ceramic capacitors, the dielectric layer is being made thinner, and the number of laminated layers is increasing.

A laminated ceramic capacitor is required to have not only a large electrostatic capacitance, but also a high insulation resistance. However, since the insulation resistance is proportional to the thickness of the dielectric layer, when the dielectric layer was made thinner, although a large electrostatic capacitance was obtained, this insulation resistance tended to decrease.

A laminated ceramic capacitor has therefore been proposed wherein the decrease of insulation resistance due to increasing thinness is suppressed. Herein, the dielectric layer contains a structure formed from only one of particle of the ceramic material which comprises the dielectric layer, i.e., "one layer-one particle structure" (e.g., JP-B No. 3370933).

SUMMARY OF THE INVENTION

However, even with a laminated ceramic capacitor having a dielectric layer containing a one layer-one particle structure as in the aforesaid prior art, it was still difficult to obtain sufficient insulation resistance.

It is therefore an object of the invention, which was conceived in view of the aforesaid prior art, to provide a laminated ceramic capacitor which, even if the dielectric layer is made thinner to obtain a high electrostatic capacitance, can still maintain sufficient insulation resistance.

When the Inventors carried out a detailed examination, they discovered that in the aforesaid prior art laminated ceramic capacitor, the poor insulation resistance was due to the following factors. In the dielectric layer, although the resistance of inside of crystalline particles of the ceramic material was low, the particle boundaries had a relatively high resistance. In a laminated ceramic capacitor, the insulating properties of the dielectric layer are strongly maintained by these high resistance particle boundaries. However, in a dielectric layer having the aforesaid one layer-one particle structure, there are very few high resistance particle boundaries. Hence, in a laminated ceramic capacitor having a dielectric layer containing a one particle structure, insulating properties tend to be insufficient.

As a result of further studies based on the aforesaid observations, the Inventors found that by providing a special layer between the dielectric layer and the internal electrodes, sufficient insulation resistance could be obtained even in the case of a laminated ceramic capacitor having a dielectric layer containing a one layer-one particle structure, and thereby arrived at the present invention.

Specifically, the laminated ceramic capacitor of the present invention comprises a pair of electrodes, a dielectric layer disposed between the pair of electrodes comprising a dielectric material containing a ceramic material, and a high resistance layer disposed between the electrodes and dielectric layer containing a ceramic material and a metal element, wherein the dielectric layer contains dielectric material particles and has a site formed of only one of these particles in its thickness direction, and the high resistance layer contains one or more metal elements selected from a group comprising Mn, Cr, Co, Fe, Cu, Ni, Mo and V as the metal element.

Another laminated ceramic capacitor according to the present invention comprises a pair of electrodes, a dielectric layer disposed between the pair of electrodes which is formed of a dielectric material containing a ceramic material, and a high resistance layer containing a ceramic material and a metal element, wherein the dielectric layer contains dielectric material particles and has a site formed of only one of these particles in its thickness direction, and the high resistance layer contains a rare earth element as the metal element.

These laminated ceramic capacitors have a high resistance layer comprised a ceramic material and a predetermined metal element between the electrodes (internal electrodes) and dielectric layer. The high resistance layer has higher insulating properties than the dielectric material forming the dielectric layer. Therefore, the laminated ceramic capacitor of the aforesaid construction maintains an insulation resistance at a sufficiently high level although it has a dielectric layer containing a one layer-one particle structure, and therefore contains few high resistance particle boundaries.

When the high resistance layer contains both of the aforesaid types of predetermined element, superior insulating properties are obtained which is preferred. In other words, the laminated ceramic capacitor according to the present invention comprises a pair of electrodes, a dielectric layer comprising a dielectric material containing a ceramic material, and a high resistance layer disposed between the electrodes and dielectric layer which contains a ceramic material and a predetermined element, wherein the dielectric layer contains dielectric particles and has a site formed of only one of these particles in its thickness direction, and the high resistance layer contains one or more elements selected from a group comprising Mn, Cr, Co, Fe, Cu, Ni, Mo and V, and a rare earth element, as the predetermined element.

The rare earth element is preferably one or more elements selected from a group comprising Y, Dy, Gd, Ho, Sc, Er, Yb, Tb and Tm.

The ceramic material contained in the high resistance layer preferably contains the same elements as the component elements of the ceramic material contained in the dielectric layer. In this case, a high resistance layer having better insulating properties than those of the dielectric layer is easily obtained.

In the laminated ceramic capacitor according to the present invention, the dielectric material preferably contains one or more elements selected from a group comprising Mn, Cr, Co, Fe, Cu, Ni, Mo and V, and/or a rare earth element. In a dielectric layer comprising a dielectric material containing these elements, the ceramic material has higher stability. Due to the dielectric material containing these elements, the decrease of insulation resistance arising from time-dependent deterioration of the ceramic material can also be suppressed.

In the case where the dielectric material contains the aforesaid elements, the dielectric material preferably contains the same elements as the predetermined elements contained in the high resistance layer, the blending ratio of these elements in the high resistance layer being higher than the blending ratio of the same elements in the dielectric material particles. In this case, a high resistance layer having far superior insulating properties to those of the dielectric layer can be obtained, and as a result, the insulation resistance of the laminated ceramic capacitor can be further enhanced.

More specifically, when the predetermined element is one or more elements selected from among a group comprising Mn, Cr, Co, Fe, Cu, Ni, Mo and V, the blending ratio of this element contained in the high resistance layer is preferably twice or more than the blending ratio of the same element contained in the dielectric material particles. Further, if the predetermined elements contain a rare earth element, the blending ratio of this element in the high resistance layer is preferably 1.5 times or more that of the same element contained in the particles forming the dielectric material.

In this case, a high resistance layer having superior insulating properties to those of the dielectric layer can satisfactorily be obtained. The dielectric material may contain both of the aforesaid two types of elements as the predetermined element, in which case it is preferred that these elements respectively satisfy the aforesaid conditions.

The ceramic material contained in the dielectric material is preferably a complex oxide having Ba and Ti as its principal ingredients. In this case, a ceramic capacitor having superior electrostatic capacitance and insulation resistance is obtained.

Among the one or more elements selected from a group comprising Mn, Cr, Co, Fe, Cu, Ni, Mo and V, Mn is preferred, and as the rare earth element, Y is preferred. It is particularly preferred that the predetermined element contained in the high resistance layer is Mn and Y In this case, the electrostatic capacitance and insulation resistance can be further enhanced, and deterioration of the dielectric layer can be further reduced.

DESCRIPTION OF THE PREFERRED EMBODIMENTS

Figure 1:
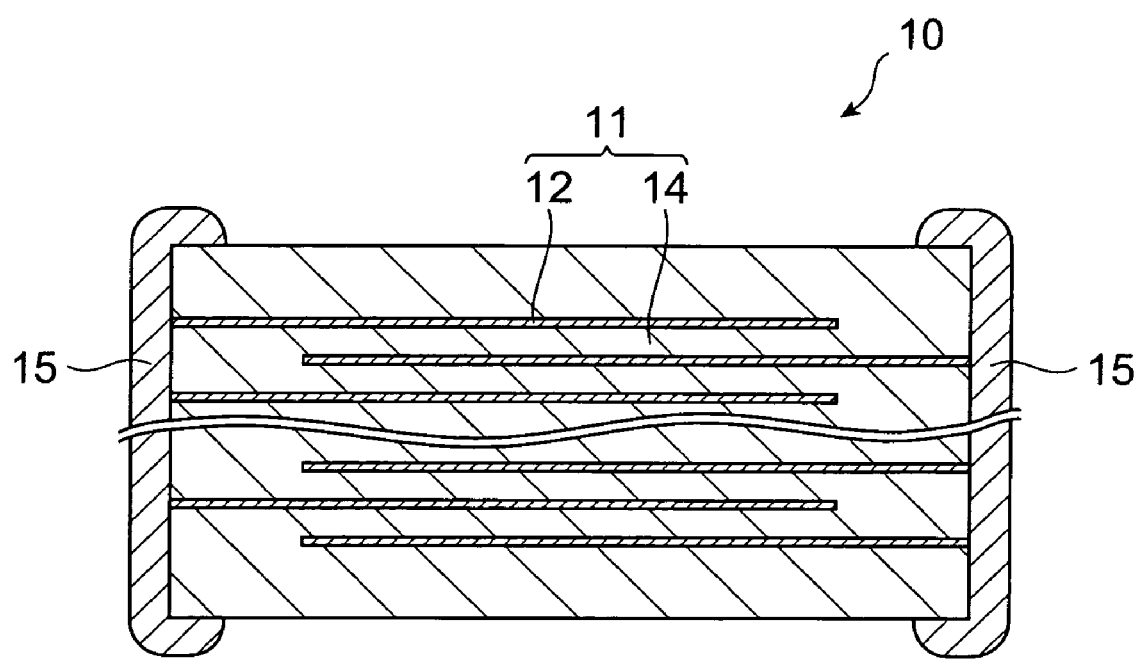
FIG. 1 is a schematic view showing the cross-sectional structure of the laminated ceramic capacitor according to one aspect of the invention.

Hereafter, one aspect of the present invention will be described referring to the drawings. In the drawings, the same elements are assigned identical symbols, and their description will not be repeated.

FIG. 1 is a drawing schematically showing a cross-section of a laminated ceramic capacitor according to this aspect. A capacitor 10 (laminated capacitor) comprises a rectangular parallelepiped-shaped capacitor body 11 wherein internal electrodes 12 and dielectric layers 14 are alternately laminated, and external electrodes 15 are respectively provided on opposite end faces of this capacitor body 11.

Figure 2:
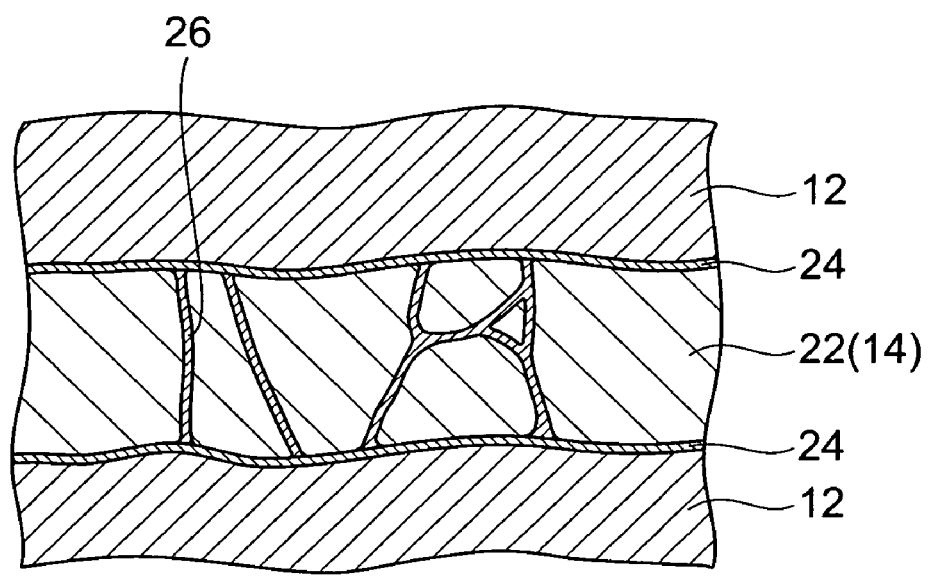
FIG. 2 is a schematic view showing an enlargement of the vicinity of the interface between the internal electrodes 12 and dielectric layer 14 in the laminated ceramic capacitor shown in FIG. 1.

FIG. 2 is a schematic view showing an enlargement of the region in the vicinity of the interface between the internal electrode 12 and dielectric layer 14 in the laminated ceramic capacitor shown in FIG. 1. As shown in the figure, the dielectric layer 14 has a structure wherein plural crystalline particles 22 (particles) are arranged. High resistance layers 24 are formed between these crystalline particles 22 (dielectric layer 14) and internal electrodes 12.

In this capacitor 10, the internal electrodes 12 are formed so that one end of the internal electrode 12 is exposed on the end face of the capacitor body 11, and the internal electrodes 12 are laminated so that the ends thereof is alternately exposed on the opposite end face of the capacitor body 11. The component materials of the internal electrodes 12 are not particularly limited provided that they are electrically conducting materials usually used for the internal electrodes of laminated electrical elements. Examples of such electrically conducting materials are Ni and Ni alloys. The Ni alloy preferably contains 95 mass % or more of Ni, and contains at least one of Mn, Cr, Co and Al.

The external electrodes 15 are respectively provided on the end faces onto which the end parts of the internal electrodes 12 in the capacitor body 11 is exposed. Due to this, the internal electrodes 12 and external electrodes 15 are connected to each other so that there is electrical conductivity between the two. The external electrodes 15 may be Cu or Cu alloy, Ni or Ni alloy, Ag or Ag alloy (e.g., Ag—Pd alloy), and Sn or Sn alloy. From the viewpoint of reducing the manufacturing cost of the capacitor 10, the use of relatively low-cost Cu or Ni, or alloys thereof, is preferred.

The high resistance layer 24 is a layer formed between the internal electrodes 12 and dielectric layer 14, and contains a ceramic material and predetermined element, but more specifically a metal element. The metal element contained in the high resistance layer 24 is one or more metal elements selected from a group comprising Mn, Cr, Co, Fe, Cu, Ni, Mo and V (hereafter, "Element 1"), or a rare earth element (hereafter, "Element 2"), or combinations thereof.

Element 1 is preferably Mn or Cr, but Mn is more preferred. Element 2 is preferably Y, Dy, Gd or Ho, but Y is more preferred. When the high resistance layer 24 contains a combination of Element 1 and Element 2, particularly good insulating properties are obtained and this option is therefore particularly preferred. As an example of a suitable combination, Element 1 may be Mn and Element 2 may be Y The ceramic material contained in the high resistance layer 24 is not particularly limited provided that the properties of the dielectric layer 14 are not impaired thereby. This ceramic material may for example contain the same elements as the component elements of the ceramic material forming the dielectric layer 14, described later. The high resistance layer 24, in addition to the aforesaid metal elements and ceramic material, may further contain other impurities.

The dielectric layer 14 comprises a dielectric material including a ceramic material. The dielectric layer 14 has a structure wherein the crystalline particles 22 are aligned, and regions 26 comprising a ceramic material containing the same elements as the particles 22 are formed surrounding the crystalline particles 22. The aforesaid high resistance layers 24 are formed such that the aforesaid regions formed mainly between the crystalline particles 22 and internal electrodes 12 are connected each other. In these high resistance layers 24 having the aforesaid structure, the aforesaid metal elements may for example be substituted for the component elements of the ceramic material.

The ceramic material contained in the dielectric material may be a high dielectric constant ceramic material known in the art usually used for ceramic capacitors. For example, it may be a barium titanate ($BaTiO_3$) material, a lead complex perovskite compound material, or a strontium titanate (Sr- TiO$_3$) material. The dielectric material, in addition to these ceramic materials, may further contain other ingredients such as sintering agents.

Among the above ceramic materials, from the viewpoint that it has a superior dielectric constant and can achieve a high electrostatic capacity, BaTiO$_3$ which is a complex oxide having Ba and Ti as its main ingredients, is preferred. As a result of this BaTiO$_3$ material, the improvement of insulating properties due to the high resistance layer 24 is particularly satisfactory.

The BaTiO$_3$ material is preferably a material wherein the basic ingredient is BaTiO$_3$, and wherein the Ba or Ti in this composition are suitably substituted by other metal elements. For example, in the material, part of the Ba may be substituted by Ca or Sr, or part of the Ti may be substituted by Zr. The BaTiO$_3$ material may for example be "[(Ba$_{1-x-y}$Ca$_x$Sr$_y$)O]$_m$(Ti$_{1-x}$Zr$_x$)O$_2$". Herein, x is 0-0.25 but preferably 0.05-0.10, y is 0-0.05 but preferably 0-0.01, z is 0.1-0.3 but preferably 0.15-0.20, and m is 1.000-1.020 but preferably 1.002-1.015, respectively.

The dielectric layer 14, as described hereinabove, is formed by arranging the crystalline particles 22 of dielectric material. In the capacitor 10 according to this aspect of the invention, the dielectric layer 14 has a site (one layer-one particle structure) formed of only one of the crystalline particles 22 in its thickness direction. This one layer-one particle structure is preferably formed to the extent of about 10-80%, but more preferably about 40%, relative to the total length in the width direction of the dielectric layer 14. The proportion of this one layer-one particle structure may be computed as follows. First, the capacitor 10 is cut in a direction perpendicular to the internal electrodes 12. Next, this cut surface is observed, the particle diameters of the crystalline particles 22 exposed on the surface are measured, and the average particle diameter is computed. From this, straight lines are drawn perpendicular to the internal electrodes 12 at intervals of this average particle diameter, and the number of straight lines thereof which are present in the one layer-one particle structure is counted. The proportion of straight lines in the one layer-one particle structure relative to the total number of straight lines is computed, and this is taken as the proportion of the one layer-one particle structure in the dielectric layer 14.

The dielectric material forming the dielectric layer 14, in addition to the aforesaid ceramic material, preferably contains the same kind of metal elements as the metal elements contained in the high resistance layer 24. Specifically, the dielectric material preferably contains Element 1 or Element 2, or a combination thereof. Due to these elements, the dielectric layer 14 is stabilized, and the time-dependent decrease of insulation resistance of the capacitance 10 can be suppressed.

When the dielectric material contains a metal element, the metal element in the dielectric material is preferably the same as the metal element in the high resistance layer 24. In this case, it is particularly preferred that the blending ratio of the metal element in the high resistance layer 24 is larger than the blending ratio of the metal element in the crystalline particles 22. The high resistance layer 24 which satisfies this condition has a far superior insulation resistance to that of the crystalline particles 22 (dielectric layer 14). As a result, the insulation resistance of the capacitor 10 is very satisfactory.

When the high resistance layer 24 and crystalline particles 22 contain Element 1, the blending ratio of this element in the high resistance layer 24 is preferably 2 times or more, more preferably 2-15 times, still more preferably 2-10 times and still more preferably 2-5 times the blending ratio of the same element in the crystalline particles 22. If the blending ratio of the element 1 in the high resistance layer 24 is 2 times or more than that in the crystalline particles 22, the high resistance layer 24 having a far superior insulation resistance to that of the dielectric layer 14 is easily obtained. On the other hand, if 15 times is exceeded, the insulation resistance of the high resistance layer 24 may decrease due to the excessive metal element (Element 1).

If they contain Element 2, the blending ratio of this element in the high resistance layer 24 is preferably 1.5 times or more, more preferably 1.5-5 times and still more preferably 1.5-3 times the blending ratio of the same element in the crystalline particles 22. If the blending ratio of this element in the high resistance layer 24 is 1.5 times or more that in the crystalline particles 22, the high resistance layer 24 having a far superior insulation resistance to that of the dielectric layer 14 is easily obtained. On the other hand, if 5 times is exceeded, the insulation resistance of the high resistance layer 24 may decrease due to the excessive rare earth element.

Further, when the high resistance layer 24 contains a combination of Element 1 and Element 2, both elements preferably satisfy the aforesaid conditions respectively. The blending ratio of the metal element in the high resistance layer 24 or crystalline particles 22 may be expressed for example as a mass ratio (mass %) of the metal element contained in a predetermined volume relative to the total mass of this volume of the high resistance layer 24 or crystalline particles 22. The blending ratio of this metal element may be computed by for example applying a compositional analysis known in the art. This compositional analysis technique may be for example Energy Dispersion X-ray Spectroscopy (EDS) or the like.

The capacitor 10 according to this aspect of the invention may have a length of about 1.5-1.7 mm×width of about 0.7-0.9 mm. In the capacitor 10 of this size, the thickness of the internal electrodes 12 is preferably about 1-5 μm but more preferably about 1-3 μm, and the thickness of the external electrodes is preferably about 10-50 μm. The thickness of the dielectric layer 14 is preferably 1-6 μm, but more preferably 1-4 μm. Still more preferably, the thickness of the high resistance layer 24 is about 0.001-5% relative to the thickness of the dielectric layer 14.

The capacitor 10 having the aforesaid structure may be manufactured for example by applying a laminated ceramic capacitor manufacturing technique known in the art which is described below. First, the starting materials for the ceramic material of the dielectric material are prepared, and weighed. Next, the aforesaid Element 1 and/or Element 2 and other ingredients are added to this starting material mixture, and wet-mixed by a ball mill or the like. After drying this mixture, it is temporarily sintered at about 800-1300° C.

Subsequently, the obtained temporary sintered composition is crushed to a predetermined particle size by a jet mill or ball mill. A binder or a plasticizer is then mixed with this crushed product to prepare a dielectric paste. At the same time, the electrically conducting material of the internal electrodes 12 is mixed with an organic vehicle containing a binder and solvent to prepare an internal electrode paste.

By alternately coating and laminating this dielectric paste and internal electrode paste, a laminated body wherein layers of the dielectric paste and internal electrode paste are alternately laminated, is obtained. A green chip is then obtained by cutting this laminated body to a predetermined size, and the binder is removed by heating this green chip.

Subsequently, permanent sintering is performed at a temperature of about 1200-1400° C. in an inert atmosphere such as N₂ or H₂ to obtain the capacitor body 11. A paste for forming the external electrodes 15 is then sintered on both ends of the external electrodes 15 to form the capacitor 10.

In this method of manufacturing the capacitor 10, the high resistance layer 24 may be formed by for example coating a paste containing the starting material for the high resistance layer 24 before or after coating the dielectric paste. Alternatively, if the dielectric material contains a metal element as discussed previously, the high resistance layer 24 containing the ceramic material and metal element may be formed also by increasing the addition amount of metal element starting material more than that usually used. This cause that the metal element could no longer be dissolved in solid solution in the crystalline particles 22. As the result, the metal element become present in the regions surrounding the crystalline particles 22, particularly the regions formed between the internal electrodes 12 and dielectric layer 14.

As described above, the capacitor 10 which is a laminated ceramic capacitor according to this aspect of the invention comprises the high resistance layers 24 between the internal electrodes 12 and dielectric layer 14. This capacitor 10, since it comprises the thin dielectric layer 14 containing a one layer-one particle structure, has a much larger electrostatic capacitance.

In the preferred case, the high resistance layer 24 contains a ceramic material having the same kind of elements as the dielectric layer 14, and the same metal elements as those in the dielectric layer 14, the blending ratio of the metal elements in this high resistance layer 24 being larger than that in the crystalline particles 22 of the dielectric layer 14. This high resistance layer 24 has far superior insulating properties to those of the dielectric layer 14. Therefore, the capacitor 10 having the aforesaid structure has a superior insulation resistance to the laminated ceramic capacitor containing a one layer-one particle structure which does not have this type of high resistance layer.

EXAMPLES

The invention will now be described in more detail referring to specific examples, but it should be understood that the invention is not to be construed as being limited in any way thereby.

Manufacture of Laminated Ceramic Capacitor

First, $BaTiO_3$, $BaZrO_3$ and $CaTiO_3$ were prepared as ceramic material starting materials, and $MnCO_3$ and $Y_2O_3$ were prepared as metal element starting materials. These were wet-mixed by a ball mill, and temporarily sintered at 1000° C. for 3 hours. A binder, plasticizer, dispersion agent and solvent were then added to this temporarily sintered product to prepare a dielectric paste. At the same time, using Ni as an electrically conducting material, a binder, solvent, dispersion agent and plasticizer were added to prepare an internal electrode paste.

Next, this dielectric paste and internal electrode paste were alternately laminated, and the obtained laminated body was cut to a predetermined shape and size to obtain a green chip. Subsequently, this green chip was sintered at 1300° C. for 2 hours in an atmosphere containing humidified N₂ and H₂ to obtain a capacitor body. This capacitor body was then subjected to heat treatment at 1000° C. for 3 hours in a N₂ atmosphere as a re-oxidation treatment of the dielectric layer. External electrodes having a 3-layer structure containing a Cu layer, Ni layer and Sn layer from the body side was then formed on the end surfaces of the capacitor body so as to obtain the laminated ceramic capacitor having the structure shown in FIG. 1.

Compositional Analysis

Figure 3:
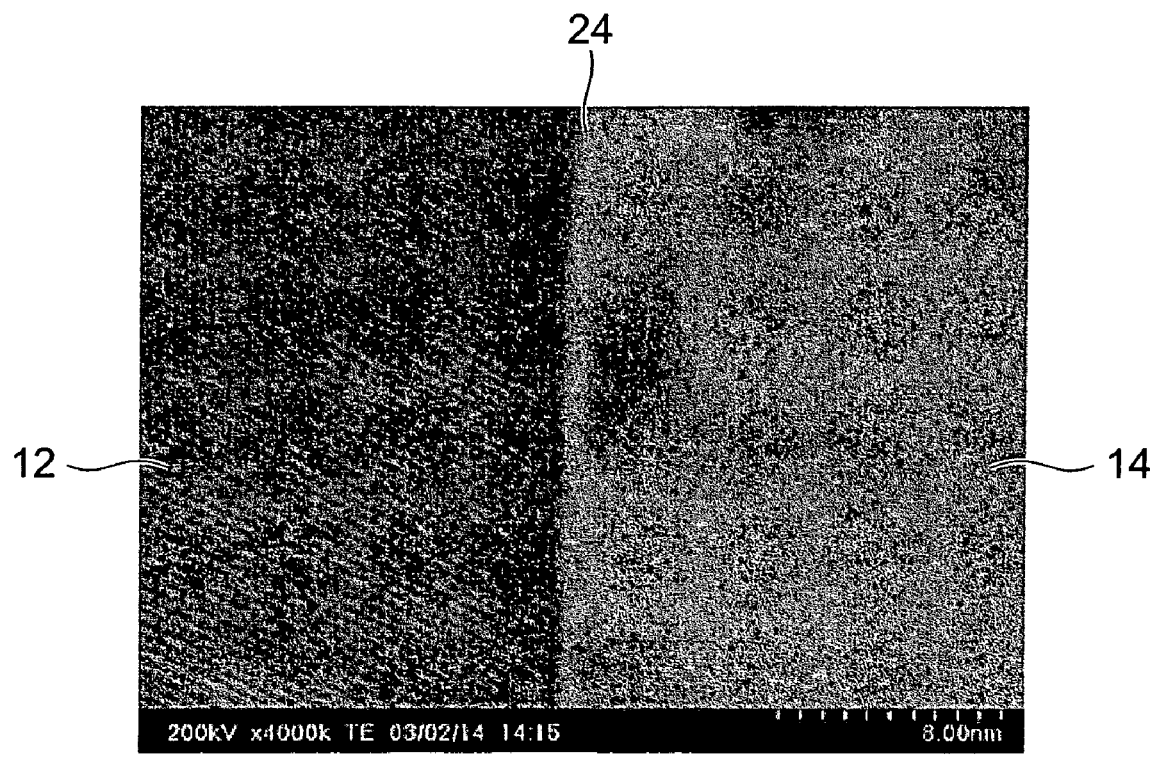
FIG. 3 is a figure showing a transmission electron micrograph of the vicinity of the interface between the internal electrode and the dielectric layer.

The obtained laminated ceramic capacitor was cut in a perpendicular direction to the internal electrode to a thin film shape. The surface of this thin film was observed by transmission electron microscopy (TEM). FIG. 3 is a figure showing a transmission electron micrograph of the vicinity of the interface between the internal electrode and the dielectric layer. In FIG. 3, 12, 14 and 24 respectively denote the internal electrodes, dielectric layer and high resistance layers. From FIG. 3, it was confirmed that in the obtained ceramic capacitor, a high resistance layer was formed between the internal electrode and dielectric layer.

At the same time as the aforesaid TEM observation, a compositional analysis was performed by energy dispersion X-ray spectroscopy (EDS) at arbitrary points in regions in the crystalline particles of the dielectric layer and regions in the high resistance layer formed between the internal electrode and dielectric layer. TABLE 1 shows the results obtained at the points in regions of the crystalline particles, and TABLE 2 shows the results obtained at points in regions of the high resistance layer. In TABLE 1 and TABLE 2, the composition of each element is shown by a value converted to its oxide (units: mass %).

TABLE 1

| Measurement point No. | BaO | CaO | TiO₂ | ZrO₂ | Y₂O₃ | MnO |
|---|---|---|---|---|---|---|
| 1 | 53.9 | 0.2 | 25.3 | 18.9 | 1.4 | 0.3 |
| 2 | 51.7 | 0.1 | 26.1 | 20.2 | 1.6 | 0.2 |
| 3 | 53.9 | 0.2 | 29.4 | 15.2 | 1.0 | 0.3 |
| 4 | 59.1 | 0.4 | 25.3 | 13.2 | 1.5 | 0.5 |
| 5 | 53.2 | 0.5 | 28.3 | 15.8 | 1.4 | 0.7 |
| 6 | 54.3 | 0.5 | 27.6 | 15.5 | 1.3 | 0.7 |
| Average value | 54.4 | 0.3 | 27.0 | 16.5 | 1.4 | 0.5 |

TABLE 2

| Measurement point No. | BaO | CaO | TiO₂ | ZrO₂ | Y₂O₃ | MnO |
|---|---|---|---|---|---|---|
| 7 | 61.5 | 0.5 | 22.7 | 10.8 | 2.4 | 2.2 |
| 8 | 63.5 | 1.0 | 22.2 | 7.5 | 4.0 | 1.8 |
| 9 | 61.8 | 0.9 | 23.8 | 7.9 | 3.4 | 2.1 |
| 10 | 57.6 | 1.1 | 27.3 | 8.4 | 3.1 | 2.5 |
| 11 | 55.3 | 1.0 | 29.2 | 8.5 | 3.3 | 2.8 |
| Average value | 59.9 | 0.9 | 25.0 | 8.6 | 3.2 | 2.3 |

From TABLE 1 and TABLE 2, it is seen that in the laminated ceramic capacitor obtained in above example, Mn and Y in the ceramic material are contained to a greater extent in the high resistance layer than in the crystalline particles.

As described above, according to the present invention, a laminated ceramic capacitor can be provided wherein, even in the case of a thin dielectric layer containing a one-layer-one-particle structure for the purpose of increasing electrostatic capacitance, sufficient insulation resistance can still be maintained, and which therefore easily lends itself to commercial application.

What is claimed is:

1. A laminated ceramic capacitor, comprising:
a pair of electrodes;
a dielectric layer disposed between said pair of electrodes, comprising a dielectric material including a ceramic material; and
a high resistance layer disposed between said electrodes and said dielectric layer, containing a ceramic material and a predetermined element, wherein:
said dielectric layer contains crystalline particles of said dielectric material, said dielectric layer having at least one area formed of only one of these crystalline particles in thickness direction of said dielectric layer, and said high resistance layer contains at least one type of element selected from among a group comprising Mn, Cr, Co, Fe, Cu, Ni, Mo and V as said predetermined element.

2. The laminated ceramic capacitor according to any of claim 1, wherein said ceramic material contained in said high resistance layer contains the same elements as the elements of said ceramic material contained in said dielectric layer.

3. The laminated ceramic capacitor according to any of claim 1, wherein said dielectric material further contains one or more elements selected from a group comprising Mn, Cr, Co, Fe, Cu, Ni, Mo and V, and/or a rare earth element.

4. The laminated ceramic capacitor according to claim 3, wherein said dielectric material contains the same elements as said predetermined elements contained in said high resistance layer, and the blending ratio of said element in said high resistance layer is larger than the blending ratio of the element in said particles of said dielectric material.

5. The laminated ceramic capacitor according to claim 1, wherein said dielectric material contains the element which is one or more elements selected from among a group comprising Mn, Cr, Co, Fe, Cu, Ni, Mo and V, and which is the same element as that contained in said high resistance layer; and
the blending ratio of said element in said high resistance layer is 2 times or more the blending ratio of the element in said particles of said dielectric material.

6. The laminated ceramic capacitor according to any of claim 1, wherein said ceramic material contained in said dielectric material is a complex oxide having Ba and Ti as principal ingredients.

7. The laminated ceramic capacitor according to any of claim 1, wherein said predetermined element contained in said high resistance layer is Mn or Y.

8. A laminated ceramic capacitor, comprising:
a pair of electrodes;
a dielectric layer disposed between said pair of electrodes, comprising a dielectric material including a ceramic material; and
a high resistance layer disposed between said electrodes and said dielectric layer, containing a ceramic material and a predetermined element, wherein:
said dielectric layer contains crystalline particles of said dielectric material, said dielectric layer having at least one area formed of only one of these crystalline particles in thickness direction of said dielectric layer, and said high resistance layer contains a rare earth element as said predetermined element.

9. The laminated ceramic capacitor according to claim 8, wherein said rare earth element is one or more elements selected from a group comprising Y, Dy, Gd, Ho, Sc, Er, Yb, Tb and Tm.

10. The laminated ceramic capacitor according to claim 8, wherein said dielectric material contains the rare earth element which is contained in said high resistance layer; and
the blending ratio of said element in said high resistance layer is 1.5 times or more the blending ratio of the element concerned in the particles of said dielectric material.

11. A laminated ceramic capacitor, comprising:
a pair of electrodes;
a dielectric layer disposed between said pair of electrodes, comprising a dielectric material including a ceramic material; and
a high resistance layer disposed between said electrodes and said dielectric layer, containing a ceramic material and a predetermined element, wherein:
said dielectric layer contains crystalline particles of said dielectric material, said dielectric layer having at least one area formed of only one of these crystalline particles in thickness direction of said dielectric layer, and said high resistance layer contains at least one type of element selected from among a group comprising Mn, Cr, Co, Fe, Cu, Ni, Mo and V, and a rare earth element, as said predetermined element.

* * * * *